UNITED STATES PATENT OFFICE.

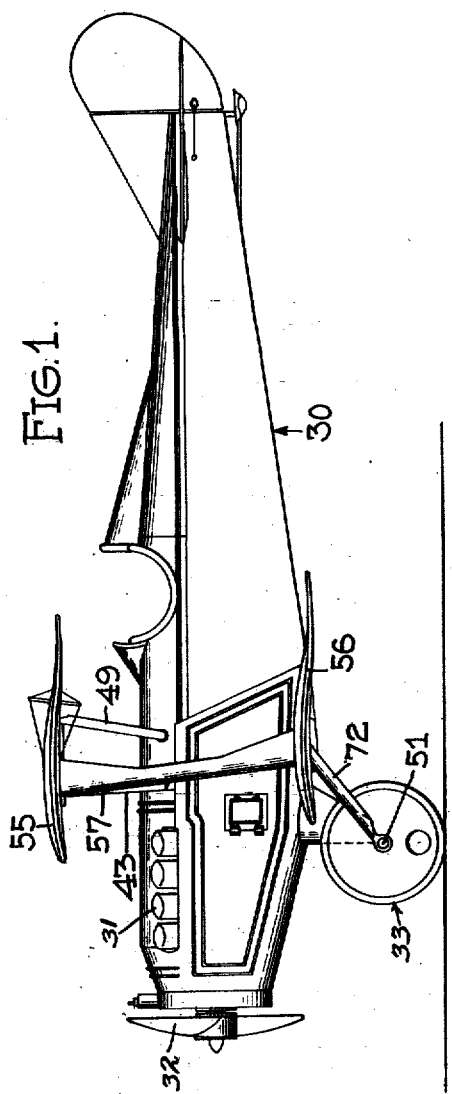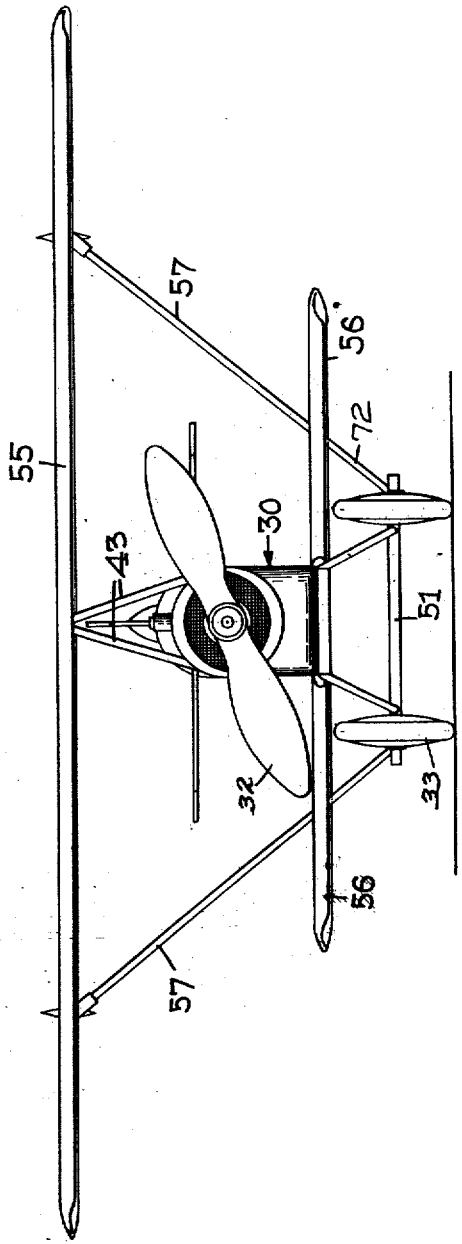

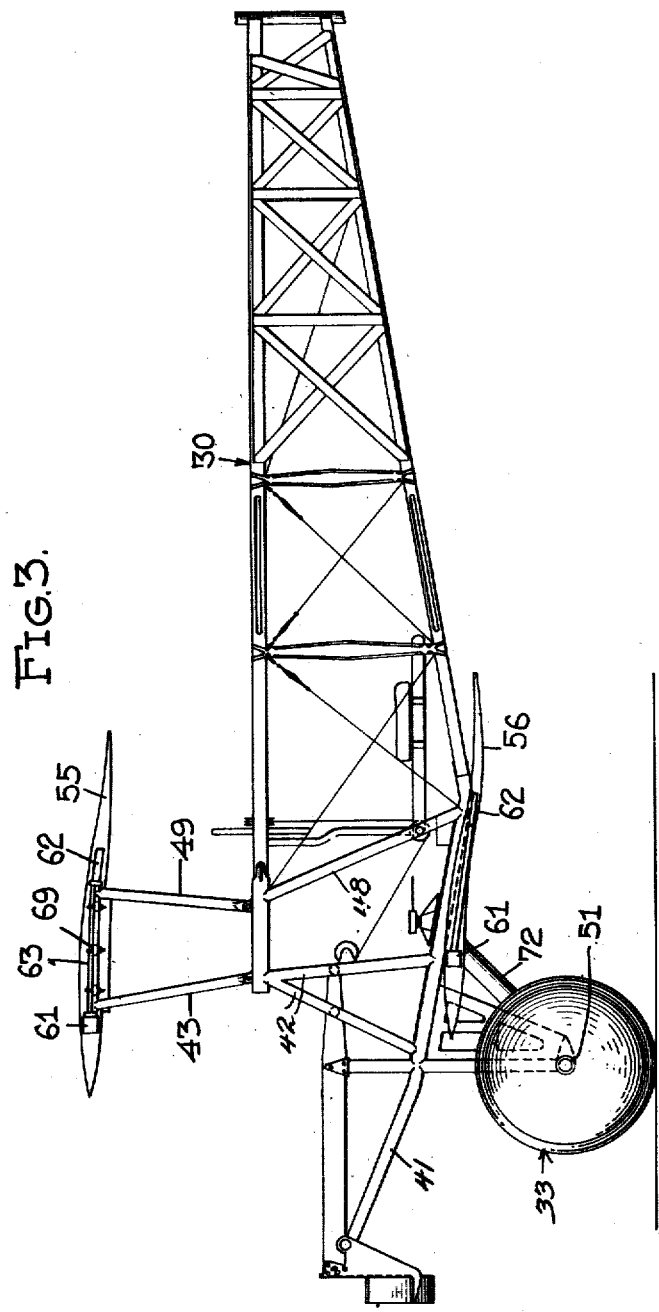

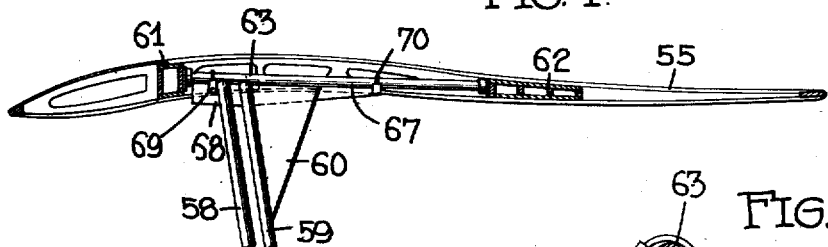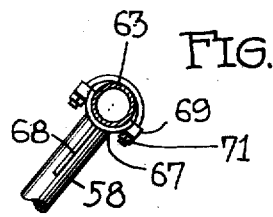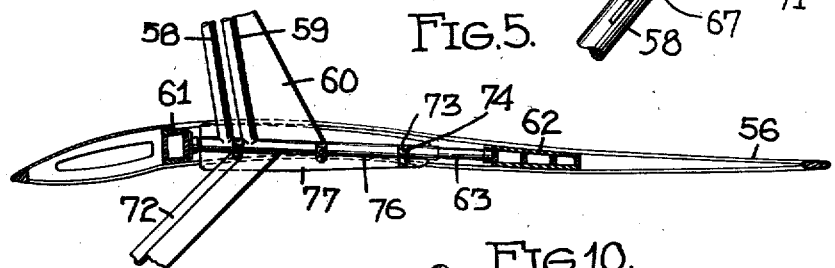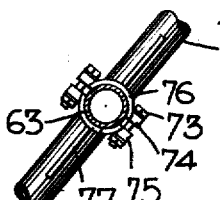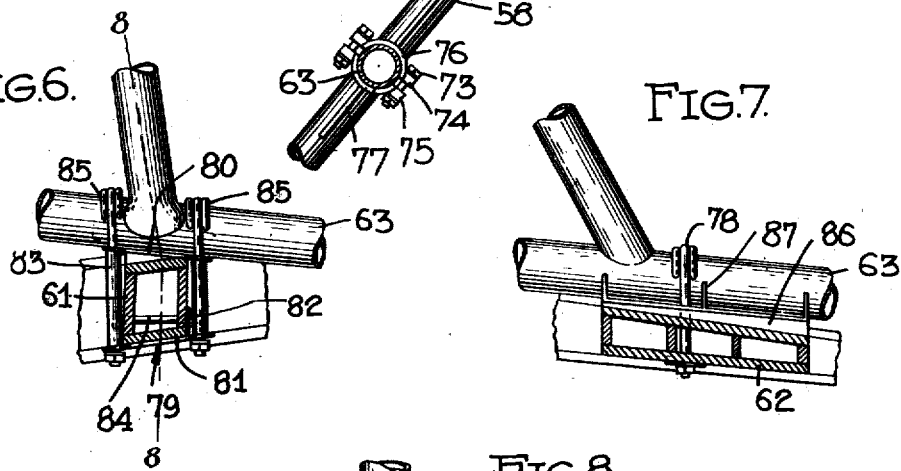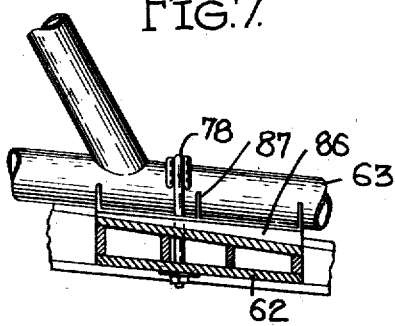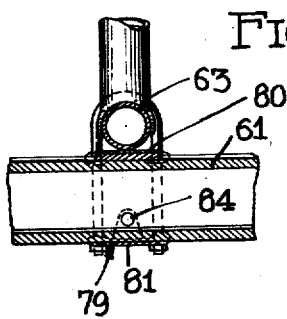

GLENN H. CURTISS, OF GARDEN CITY, NEW YORK, ASSIGNOR TO CURTISS AEROPLANE AND MOTOR CORPORATION, OF BUFFALO, NEW YORK, A CORPORATION OF NEW YORK.

AIRPLANE CONSTRUCTION.

1,368,549.   Specification of Letters Patent.   Patented Feb. 15, 1921.

Original application filed December 22, 1916, Serial No. 138,499. Divided and this application filed April 5, 1918. Serial No. 226,861.

*To all whom it may concern:*

Be it known that I, GLENN H. CURTISS, a citizen of the United States, residing at Garden City, in the county of Nassau and State of New York, have invented certain new and useful Improvements in Airplane Construction, of which the following is a specification.

My invention relates to airplanes and is a division of application Serial No. 138,499, filed December 22, 1916. The characteristic of the invention is the arrangement of the supporting surfaces respectively above and beneath the fuselage. The lower supporting surface is so arranged or positioned that its wing beams or spars lie close up under the fuselage. They are directly attached to the longérons of the fuselage at their points of intersection with them. Accordingly the lower surface (also the upper surface) may be constructed as a unit with a resulting decrease in production cost. Moreover, supporting surfaces thus constructed and attached or fastened are stronger and better in that the factor of safety is raised.

The invention is further characterized by various constructional features. These features include improved fastenings for the wings. One of these fastenings is provided at the points of attachment of the upper supporting surface with the wing posts or struts, another at the points of attachment of the forward wing beams of the lower supporting surface with the longérons of the fuselage, and still another at the points of attachment of the rear wing beams of the lower supporting surface with said longérons. In each instance the fastening devices are inclosed and consequently removed from view. Further constructional details and refinements will be hereinafter set forth.

Of the drawings, wherein like characters of reference designate like or corresponding parts:—

Figure 1 is a side elevation of the airplane.

Fig. 2 is a front end elevation.

Fig. 3 is an elevation of the fuselage assembly, the landing gear and the supporting planes.

Fig. 4 is a view illustrating in section the upper wing construction and the manner in which the wing posts are fastened.

Fig. 5 is a similar view illustrating the connection between the wing post and the lower wing.

Fig. 6 is a detail section illustrating the connection between the forward wing beam and the lower longérons of the fuselage.

Fig. 7 is a similar view illustrating the connection between the rear wing beam and said longérons.

Fig. 8 is a section on the line 8—8 of Fig. 6.

Fig. 9 is a detail view of the connection between the wing post and the upper wing, and Fig. 10 is a similar view of the connection between the wing post and the lower wing.

In the embodiment of the invention selected for illustration, 30 designates as an entirety, the fuselage or body of the craft, 31 the motor, 32 the propeller and 33, as an entirety, the landing gear.

The supporting surfaces or wings of the airplane I have designated respectively 55 and 56, the former 55 having the greater span. Both wings or planes (the machine being of the biplane type) extend transversely across the fuselage at the engine section thereof, one above and the other below the longérons. A total elimination of all lift and drift wires intermediate the planes may be described as a fundamental characteristic of the machine.

In addition to the center wing posts 43 and 49, there are but two wing posts, the said posts being arranged respectively symmetrically at opposite sides of the fuselage 30, each post extending at an oblique angle to the supporting planes with the lower terminals of respective posts in closer proximity to the sides of the fuselage than the opposite extremities thereof.

In construction, it will be noted (see Figs. 4 and 5) that the wing posts, each designated as an entirety by the numeral 57, comprise coextensive parallel tubular parts. The coextensive parts of each wing post are longitudinally spaced throughout, the forward part, designated 58 being constructed of metal tubing and the after part, designated 59, being similarly constructed and rearwardly braced as indicated at 60 at its respective terminals to distribute or increase the wing-engaging area of respective posts. By arranging the parts 58 and 59 in tandem formation, both said parts may be streamlined as a unit, (and also the braces 60); fabric such as linen being used.

Both wing beams of the supporting surfaces are of the box-beam type, the forward wing beams 61 comprising a plurality (preferably four) of connected parts. The rear wing beams 62 may be also described as box-beams although in cross section the said beams are comparatively flat and interiorly reinforced by partitions running longitudinally of the beams throughout substantially their full length. Said beams may be accordingly described as hollow and built up to secure strength and lightness. Beams of this form are better able to withstand the drift stresses incident to flight. In other respects both supporting surfaces 55 and 56 are quite similar to the supporting surfaces now in use except in so far as the number of wing frame parts is concerned. These parts it will be noted, have been appreciably reduced.

Compression tubes or members 63 interbrace the beams of each wing. These compression members are located respectively equidistant from the ends of the upper wing or plane, adjacent the terminals of said upper plane (in the plane of the wing post 57) and adjacent the terminals of the lower plane (adjacent the opposite terminals of said post).

To secure a rigid foundation of increased area for the respective wings at the wing posts, longitudinally grooved devices or channel bars 67 are provided. These devices or channel bars are formed integrally upon the respective terminals of the oblique wing posts 57 to engage the respective compression members 63 throughout the major portion of their length. The point of engagement is in this way distributed both fore and aft. Gusset plates 68 brace the respective devices, each lying almost entirely in the confines of the adjacent wing.

As a fastening means for the wing posts, ears 69 are formed on the grooved device or channel bar 67 at the upper extremity of said post and inverted U-bolts 70 arranged to extend therethrough. Said bolts 70 embrace the compression members of the upper wing and thus constitute the wing post fastening means. Nuts 71 are threaded on the U-bolt terminals (see Fig. 9).

At the lower extremity of the wing posts the fastening means is substantially the same as the fastening just disclosed. At this end, however, U-bolts 70 are eliminated. Braces 72 interconnect the lower supporting surface 56 in the plane of the wing posts 57 with the landing gear axle 51, the braces extending forwardly from the wings and inwardly in converging relation for contact with the axle adjacent its terminals. The fastening for the braces 72 is detachable in its nature to permit removal of the axle in the event of mishap. In lieu of the U-bolts, above referred to, bolts 73 are used. These bolts 73 penetrate ears 74 formed at the foot of each wing post 57 and ears 75 formed at the upper extremity of each diagonal brace 72. Said braces 72 are equipped with channeled bars or devices 76 and gusset plates 77 quite similar to the corresponding elements previously described. For an understanding of the arrangement just disclosed, reference should be had to Figs. 5 and 10.

The wing beams of the lower supporting surface 56, as stated, extend transversely across the fuselage below the lower longérons to which they are fastened. The forward wing beam of the lower wing lies in the vertical plane of the rear leg of the forward fuselage post 42 and the rear wing beam in the vertical plane of the rear fuselage post 48. Each wing beam is secured to the lower longérons of the fuselage in the immediate vicinity of said posts, the securing means for the forward wing beam contacting the longérons, at points respectively fore and aft of the forward fuselage posts and the securing means for the rear wing beam at a point aft only of the rear fuselage posts. Said fastening means in each instance may be described as comprising inverted U-bolts 78. The U-bolts for the forward wing beam (of which there are four—two for each longéron) do not penetrate the beam but engage therewith respectively at opposite sides thereof. The bolt extremities so engage an especially provided fitting 79 as to retain the fitting firmly in place against the metal portion 41 of the longérons.

The fitting 79 for each longéron comprises an upper bearing plate 80, a lower bearing plate 81 flanged as indicated at 82, and intermediate sleevelike devices 83, the latter terminally abutting the spaced plates 80 and 81 to prevent disrupture of the beam. A bolt 84 is utilized as the fastening means for the plate 81. Circumferentially extending retaining flanges 85 prevent displacement of the U-bolts 78.

Although generally similar the fastening means for the rear wing spar or beam 62 is somewhat different from the fastening just disclosed. By reason of the depth of the rear wing beam it is entirely practical to extend the extensions of the U-bolt 78 transversely therethrough. A fitting 86 flanged as at 87, however, is interposed between said beam and the lower longérons of the fuselage to provide a foundation in form corresponding to the shape of the longérons at the point where the U-bolts 78 engage. The fastenings for the respective wing beams have been detailed in Figs. 6, 7 and 8.

It will be noted from the structure disclosed that exposed surfaces have been eliminated in so far as possible and inclosed devices substituted to insure strength. This is particularly true as regards the wing structure which is stripped of all lift and drift wires. For obvious reasons the wing beams of the lower wing extend uninterruptedly beneath the fuselage without a break in their continuity. By this arrangement the lower supporting surface is strengthened without increasing the number of its parts.

While I have described my invention in detail in its present preferred embodiment, it will be obvious to those skilled in the art after understanding my invention, that various changes and modifications may be made therein without departing from the spirit or scope thereof, I aim in the appended claims to cover all such modifications and changes.

What is claimed is:

1. In an airplane, the combination with the fuselage, of a wing structure including superposed supporting surfaces, one of the supporting surfaces being extended across and beneath the fuselage, close up against the under side thereof, wing beams incorporated in the supporting surfaces as structural elements thereof, the continuity of the wing beams at the fuselage being unbroken, and means for fastening the supporting surfaces directly against the under side of the fuselage.

2. In an airplane, the combination with the fuselage, the fuselage including longérons and vertically extending fuselage struts, of a supporting surface extended intermediately across the fuselage directly beneath and close up against the lower longérons thereof, wing beams incorporated in the supporting surface, said beams being located directly beneath the vertically extending fuselage struts and fastened directly against the lower longérons.

3. In an airplane, the combination with the fuselage, the fuselage including longérons and vertically extending fuselage struts, of a supporting surface extended intermediately across the fuselage beneath and close up against the under side thereof, wing beams incorporated in the supporting surface, said beams being located directly beneath the vertically extending fuselage struts, and means for fastening the supporting surface to the fuselage including separate fastening devices directly connecting with the longérons and located respectively at opposite sides of certain of the fuselage struts.

4. In an airplane, the combination with the fuselage, the fuselage including longérons and vertically extending fuselage struts, of a supporting surface extended intermediately across the fuselage directly beneath the lower longérons and close up against the under side of the fuselage, wing beams incorporated in the supporting surface, said beams being located closely adjacent to the vertically extending struts, and fastening means for the supporting surface including inverted U-bolts arranged upon opposite sides of the fuselage struts to embrace the longérons and extend beneath the wing beams of the supporting surface.

5. In an airplane, the combination with the fuselage, the fuselage including longérons and fuselage struts, of a supporting surface extended intermediately across the fuselage directly beneath and close up against the under side thereof, wing beams incorporated in the supporting surface, said beams being located closely adjacent to the fuselage struts, means for fastening the wing beams to the longérons, and means on the longérons for holding the fastening means in place.

6. In an airplane, the combination with the fuselage, the fuselage including longérons as structural elements thereof, of a supporting surface extended intermediately across the fuselage directly beneath and close up against the under side thereof, wing beams incorporated in the supporting surface, fittings interposed between the wing beams and the longérons, and fastening means for the supporting surface connecting with the longérons, the arrangement of the fastening means being such that the fittings are clamped tightly between the wing beams and the longérons.

7. In an airplane, the combination of superposed supporting surfaces, the supporting surfaces including wing beams as structural elements thereof, compression members incorporated in the supporting surfaces, wing struts interconnecting adjacent supporting surfaces, channel bars formed upon the strut ends to receive the compression members, and means for fastening the channel bars and compression members together.

8. In an airplane, the combination of superposed supporting surfaces, each supporting surface including wing beams as structural elements thereof, compression members incorporated in the supporting surfaces, wing struts interconnecting adjacent supporting surfaces, channel bars formed upon the strut ends to receive the compression members, gusset plates formed upon the wing struts to brace the channel bars from beneath, and means for fastening the compression members and channel bars together.

9. In an airplane, the combination of superposed supporting surfaces, each supporting surface including wing beams as structural elements thereof, compression members extended from one to the other of the wing beams, wing struts extended from one to the other of the supporting surfaces, gusset plates formed on the ends of the wing struts to underlie the compression member and brace the supporting surface in a fore and aft direction from beneath, the gusset plates being longitudinally elongated to brace the wing struts for a substantial portion of their length, and means for fastening the gusset plates to the compression members.

10. In a strut, brace, spar or the like for airplanes, the combination of a longitudinally channeled terminal portion integrally formed upon and extended transversely across one end of the strut and a reinforcing gusset plate fastened respectively to the underneath faces of the terminal portion and to the trailing edge of the strut.

In testimony whereof I hereunto affix my signature.

GLENN H. CURTISS.